(12) United States Patent
Lee et al.

(10) Patent No.: US 6,975,875 B2
(45) Date of Patent: Dec. 13, 2005

(54) PAGING SYSTEM

(75) Inventors: Eng Sia Lee, Penang (MY); Heng Ho Peter Yeow, Selangor (MY); Jin Feei Loh, Perak (MY)

(73) Assignee: Redtone International PTE Ltd., Ayer Rajah Industrial Estate (SG)

( * ) Notice: Subject to any disclaimer, the term of this patent is extended or adjusted under 35 U.S.C. 154(b) by 140 days.

(21) Appl. No.: 10/415,535

(22) PCT Filed: Oct. 12, 2001

(86) PCT No.: PCT/SG01/00207

§ 371 (c)(1),
(2), (4) Date: Oct. 28, 2003

(87) PCT Pub. No.: WO02/37436

PCT Pub. Date: May 10, 2002

(65) Prior Publication Data

US 2004/0057559 A1 Mar. 25, 2004

(51) Int. Cl.$^7$ .................................... H04Q 7/20
(52) U.S. Cl. ................ 455/458; 455/459; 455/417; 379/88.15
(58) Field of Search ................. 455/458, 459, 455/417, 422.1; 379/88.15, 198, 211.02, 211.01, 212.01; 340/7.29

(56) References Cited

U.S. PATENT DOCUMENTS

| 5,140,626 | A | 8/1992 | Ory et al. |
| 5,151,930 | A | 9/1992 | Hagl |
| 5,375,162 | A | 12/1994 | Kim et al. |
| 6,567,508 | B2 * | 5/2003 | Katayama ............... 379/93.23 |

FOREIGN PATENT DOCUMENTS

| EP | 0512786 | 11/1992 | |
| JP | 409163433 A | * 6/1997 | ............ H04Q/7/22 |

* cited by examiner

Primary Examiner—Melur Ramakrishnaiah

(57) ABSTRACT

A paging system includes a private branch exchange telephone system (2) having a number of registered users (7). Each registered user (7) is associated with a unique identification code and, optionally, a cell phone number (5). The private branch exchange (2), in response to a call to the registered user's extension (EXT1), dialing a call to the cell phone number (5) associated with the registered user (7).

16 Claims, 4 Drawing Sheets

PAGING SYSTEM

The invention relates to a paging system.

In organizations, if a person is not physically at their desk, it can often be difficult for another person in the organisation, such as a receptionist, to locate that person, for example, in order to put through a telephone call to them.

Conventional solutions at overcoming this problem have used a tannoy or loudspeaker system to broadcast a call for the person that someone is trying to locate them. Alternatively, electronic paging systems exist in which an electronic paging device carried by a person alerts the person, usually by an audible alarm, to the fact that someone else is trying to locate them.

However, a disadvantage of these conventional systems is that they only cover a limited geographical area. Even in the case of an electronic paging system, which operates outside the organisation's premises, it is necessary for a person being paged to locate, a telephone to respond to the paging message. Also, if the person is outside the organisation premises, it is generally not possible for a person who is also external to the organisation to be connected to the person being paged.

In accordance with a first aspect of the present invention, there is provided a paging system comprising a private branch exchange telephone system having a number of registered users, a registered user being associated with an extension of the private branch exchange telephone system and a mobile voice communication device number, the private branch exchange, in response to a call to the registered user's extension, dialing a call to the mobile voice communication device number associated with the registered user; and whereby if the registered user responds to the call placed by the private branch exchange telephone system to the mobile voice communication device by entering an identification code on an extension of the private branch exchange telephone system, the private branch exchange telephone system diverts the call to the extension.

As used herein, the term "mobile voice communication device" means any mobile communication device which is capable of 2-way voice communication and capable of displaying or announcing a number associated with a calling party, and includes but is not restricted to, a cell phone or any other cellular communication device capable of 2-way voice communication.

An advantage of the invention is that by the private branch exchange notifying a person of an incoming call on the user's mobile voice communication device, a user may respond using the mobile voice communication device or by an extension of the private branch exchange of the user in the vicinity of user.

In the first aspect of the invention, the call may initially be directed by the private branch exchange to the user's extension, and if the extension rings more than a given number of times, the private branch exchange then places the call to the user's mobile voice communication device number.

Alternatively, the private branch exchange telephone system may immediately place the call to the user's mobile voice communication device number, without waiting for the user's extension to ring.

A call to the user may be from an extension of the private branch exchange or from the public switched telephone network.

In accordance with a second aspect of the invention, there is provided a paging system comprising a private branch exchange telephone system having a number of registered users, a registered user being associated with an extension of the private branch exchange and a mobile voice communication device number, where in response to a telephone call made from a first extension of the private branch exchange telephone system to the registered user's mobile voice communication device number, the registered user enters an identification code on a second extension of the private branch exchange telephone system, and the private branch exchange telephone system comparing the entered identification code with the identification code associated with the registered user, and if the entered identification code matches the identification code associated with the registered user, the private branch exchange telephone system diverts the call to the second extension.

The identification code may comprise the number of the extension with which the registered user is associated.

Typically, the registered user enters an instruction code on the second extension, in an addition to the identification code, the instruction code informing the private branch exchange telephone system that the registered user is requesting a call to be diverted to the second extension.

Preferably, the mobile voice communication device is a cellular 2-way voice communication device, such as a cell phone.

An example of a paging system in accordance with the invention will now be described with reference to the accompanying drawings, in which.

Figure 1:
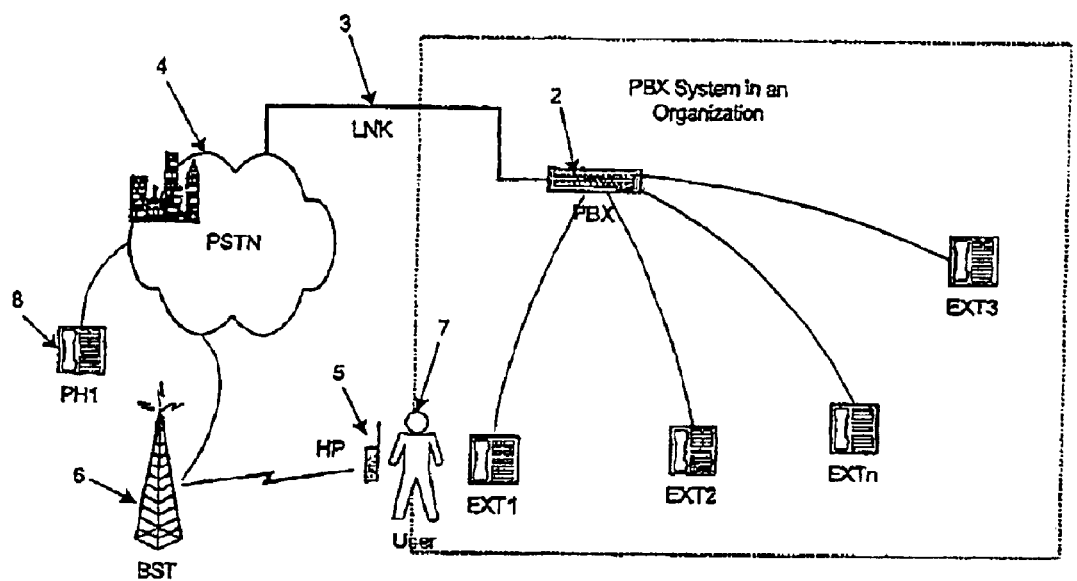
FIG. 1 is a schematic diagram of a paging system.

FIG. 1 shows a schematic diagram of a paging system, in accordance with the invention. A registered user 7 has a cell phone 5 and the registered user and the number of the cell phone 5 are associated with a telephone extension EXT1 on a private branch exchange telephone system (PBX)2. The PBX 2 may have any number of extensions EXT1, EXT2, EXT3, . . . , EXTn. In addition, the PBX 2 is connected by a telephone link 3 to the public switched telephone network (PSTN)4. The PSTN 4 may direct calls to the cell phone 5 via a cellular telecommunication network and a base station (BST) 6.

Figure 2:
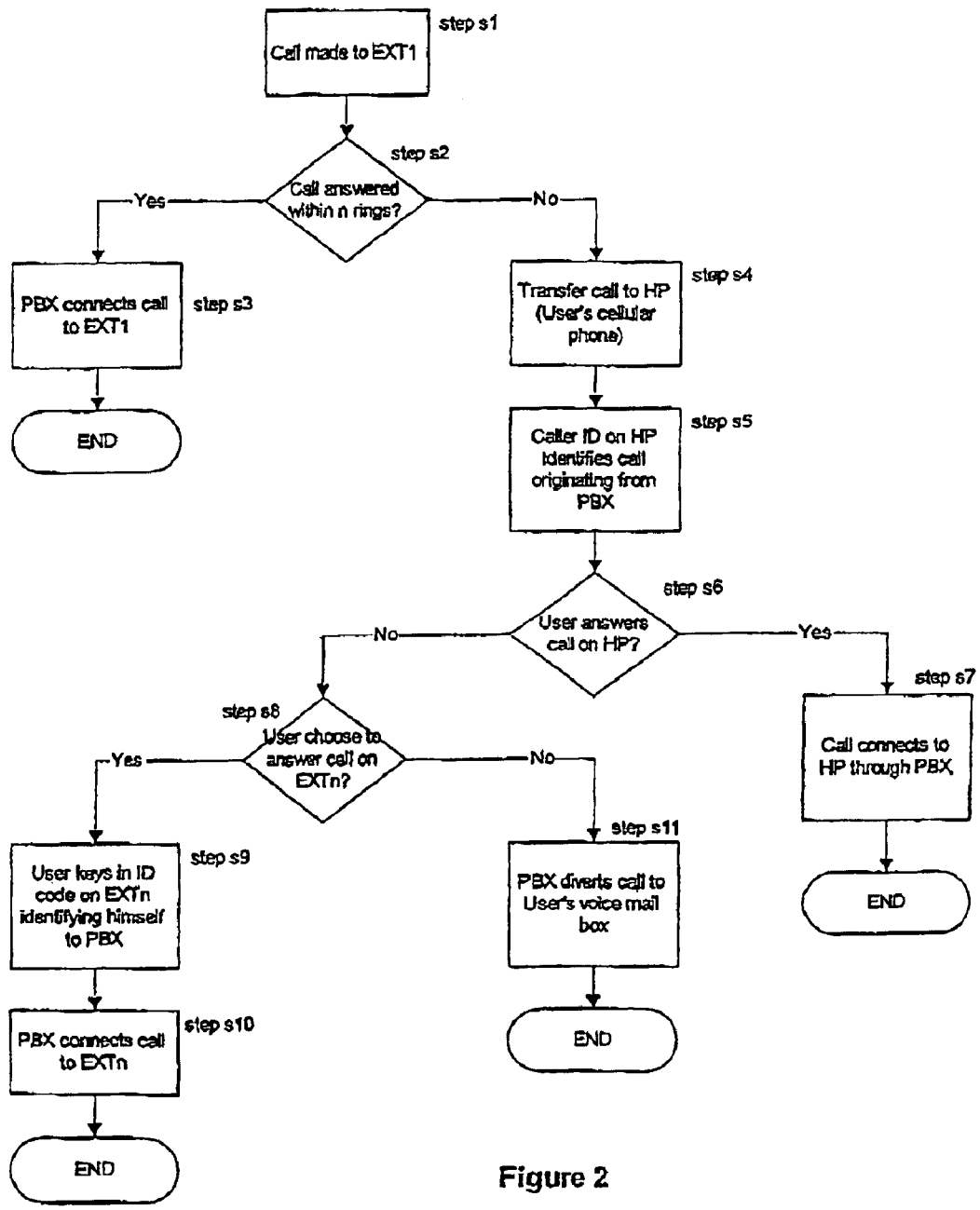
FIG. 2 is a flow diagram showing operation of the paging system when a call is made to a user's extension on a private branch exchange telephone system.

In use, if, for example, a call is made by another party from a telephone 8 coupled to the PSTN 4, or from an extension EXT2 on the PBX 2, to the extension EXT1 on the PBX 2, the PBX 2 will direct the call to the extension EXT1 step s1 (see FIG. 2). The PBX 2 monitors whether the call is answered within a set number of rings (step s2). If the call is answered within the set number of rings, the PBX 2 connects the call to EXT 1, as shown in step s3 of FIG. 2.

If the call is not answered within n rings, the PBX 2 redirects the call (step s4) to the cell phone 5 of the user 7 by placing an external call on the telephone link 3 and PSTN 4 to the cell phone 5.

Alternatively, the PBX2 may be programmed to direct all calls to the extension EXT1 direct to the cell phone 5. In this case step s2 of FIG. 2 is omitted.

Figure 4:
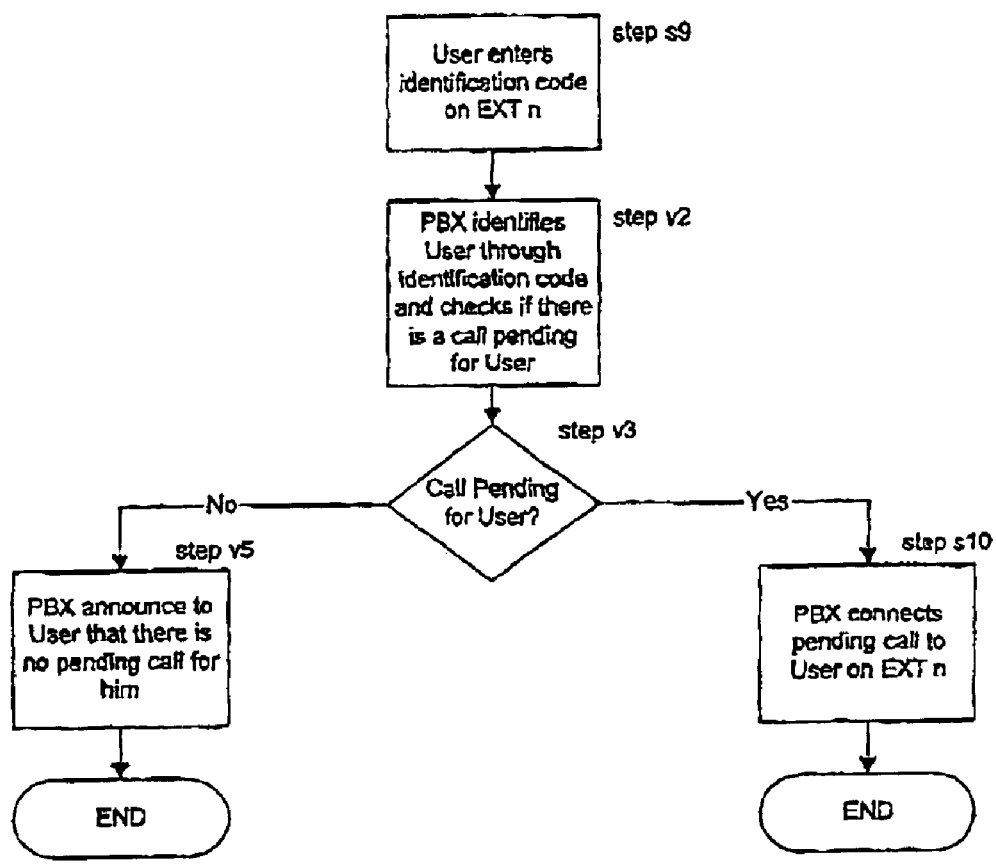
FIG. 4 is a flow diagram showing a verification process if a user requests transfer of a call to an extension on the private branch exchange.

When the cell phone 5 rings, the user 7, from the display on the cell phone 5, can determine whether the caller ID shown on the cell phone identifies the call (step s5) as originating from the PBX 2. The user 7 then has the option (step s6) to answer the call on the cell phone 5. If the user 7 answers the call on the cell phone 5, the call is connected (step s7) to the cell phone 5 through the PBX 2. If the first user 7 does not answer the call on the cell phone 5, then if the user 7 is in the vicinity of an extension EXT3, . . . , to EXTn of the PBX 2, the user 7 can choose (step s8) to answer the call on one of these extensions. If the user 7 opts to answer the call on, for example, extension EXTn, the user 7 keys in the unique identification code on the extension EXTn to identify himself to the PBX (steps s9) and to request the call to be diverted from the cell phone 5 to the extension EXTn. The PBX 2 then goes through a verification sequence, as shown in FIG. 4. After the user 7 enters the identification code (step s9), the PBX 2 identifies (step v2) the user 7 using the identification code and verifies that there is a call pending for the user 7 (step v2). If there is a call pending, PBX 2 connects (step s10) the call to the user 7 at extension EXTn. If there is not a call pending, the PBX 2 announces (step v5) to the user 7 that there are no calls pending for him.

If the user 7 at step s8 chooses not to answer the call on an extension of the PBX 2, then the paging system terminates without the call being placed to the user 7 and, for example, the call may be diverted to the voice mail box of the user 7 so that the caller may leave a message for the user 7.

Figure 3:
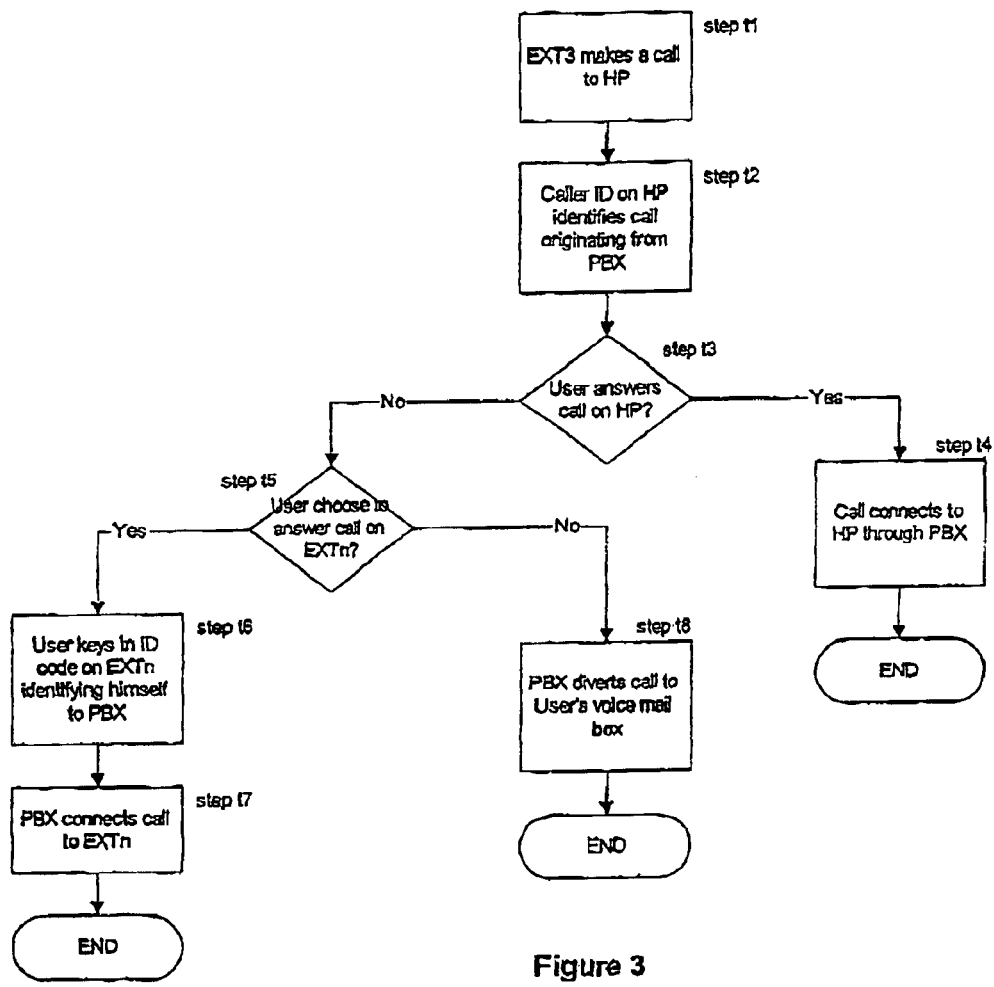
FIG. 3 is a flow diagram showing operation of the paging system when a call is placed from an extension on the private branch exchange telephone system to a user's cell phone.

In another example of the invention, illustrated in FIG. 3, extension EXT3 makes a call (step t1) to the cell phone 5 of the user 7. As the call is placed to the PSTN 4 via the PBX 2, the caller ID displayed on the cell phone 5 identifies the call (step t2) as originating from the PBX 2. When the user 7 sees that the call is originated from the PBX 2, the user 7 has the option (step t3) to answer the call on the cell phone 5. If the user 7 opts to answer the call on the cell phone 5, the call is connected to the cell phone (step t4) through the PBX 2.

If the user 7 opts not to answer the call on the cell phone 5, the user 7, if he is in the vicinity of an extension EXT1, . . . , EXTn of the PBX 2 has the option of answering the call on one of the extensions EXT1, . . . , to EXTn.

If the user 7 chooses to answer the call on an extension EXTn, the user 7 keys in his unique identification code on the extension EXTn to identify himself (step t6) to the PBX 2. The PBX 2 then goes through a similar verification process to that described above and shown in FIG. 4. If the identification code entered on extension EXTn corresponds to the identification code of the user 7 and a call is verified as pending for the user 7, the PBX 2 connects the call (step t7) to extension EXTn, and terminates the call to the cell phone 5.

If the user 7 is not close to an extension EXT1, . . . , to EXTn then the call will not be answered and caller will be told that the call cannot be connected or will be diverted (step t8), for example, to the voice mail box of the user 7.

An advantage of the invention is that it permits a paging system to be implemented using a conventional cell phone 5 and if the user 7 is in the vicinity of an extension EXT1, . . . , EXTn of the PBX 2 when the user 7 is paged using the cell phone 5, the user has the option of answering the call on the cell phone 5 or answering the call using one of the extensions EXT1, . . . , EXTn of the PBX 2.

If the user 7 is not in the vicinity of an extension EXT1, . . . , EXTn of the PBX 2, the user may respond to the paging signal received on the cell phone 5 by answering the call on the cell phone 5.

Accordingly, the invention does not require additional electronic communication devices to be carried by a user 7 to permit the paging system to operate.

In addition, if the user responds to the call to the cell phone by using an extension to the PBX 2, call charges due to the call from the PBX 2 to the cell phone 5 are minimised. Furthermore, if the user responds using an extension of the PBX 2, it is likely that the clarity of the telephone call will be improved compared with answering the call using the cell phone 5.

What is claimed is:

1. A paging system comprising a private branch exchange telephone system having a number of registered users, a registered user being associated with an extension of the private branch exchange telephone system and a mobile voice communication device number, the private branch exchange telephone system, in response to a call to the registered user's extension, dialing a call to the mobile voice communication device number associated with the registered user, and whereby if the registered user responds to the call placed by the private branch exchange telephone system to the mobile voice communication device by entering an identification code on an extension of the private branch exchange telephone system, the private branch exchange telephone system diverts the call to the extension.

2. A system according to claim 1, wherein the private branch exchange telephone system initially directs the call to the registered users extension, and if the extension rings more than a given number of times, the private branch exchange then places the call to the registered users mobile voice communication device number.

3. A system according to claim 2, wherein the identification code comprises the number of the extension with which the registered user is associated.

4. A system according to claim 2, wherein if the registered user, in addition to the identification code, enters an instruction code to instruct the private branch exchange telephone system to divert the call for the registered user associated with the entered identification code, to the second extension.

5. A system according to claim 3, wherein if the registered user, in addition to the identification code, enters an instruction code to instruct the private branch exchange telephone system to divert the call for the registered user associated with the entered identification code, to the second extension.

6. A system according to claim 1, wherein the private branch exchange telephone system directs the call to the mobile voice communication device number without first directing the call to the extension associated with the registered user.

7. A system according to claim 6, wherein the identification code comprises the number of the extension with which the registered user is associated.

8. A system according to claim 6, wherein if the registered user, in addition to the identification code, enters an instruction code to instruct the private branch exchange telephone system to divert the call for the registered user associated with the entered identification code, to the second extension.

9. A system according to claim 7, wherein if the registered user, in addition to the identification code, enters an instruction code to instruct the private branch exchange telephone system to divert the call for the registered user associated with the entered identification code, to the second extension.

10. A system according to claim 1, wherein the identification code comprises the number of the extension with which the registered user is associated.

11. A system according to claim 10, wherein if the registered user, in addition to the identification code, enters an instruction code to instruct the private branch exchange telephone system to divert the call for the registered user associated with the entered identification code, to the second extension.

12. A system according to claim 1, wherein if the registered user, in addition to the identification code, enters an instruction code to instruct the private branch exchange telephone system to divert the call for the registered user associated with the entered identification code, to the second extension.

13. A paging system comprising a private branch exchange telephone system having a number of registered user, a registered user being associated with an extension of the private branch exchange telephone system and a mobile voice communication device number, where in response to a telephone call made from a first extension of the private branch exchange telephone system to a registered user's mobile voice communication device number, the registered user enters an identification code on a second extension of the private branch exchange telephone system, and the private branch exchange telephone system in response to the entered identification code, diverts the call to the second extension.

14. A system according to claim 13, wherein the identification code comprises the number of the extension with which the registered user is associated.

15. A system according to claim 14, wherein if the registered user, in addition to the identification code, enters an instruction code to instruct the private branch exchange telephone system to divert the call for the registered user associated with the entered identification code, to the second extension.

16. A system according to claim 13, wherein if the registered user, in addition to the identification code, enters an instruction code to instruct the private branch exchange telephone system to divert the call for the registered user associated with the entered identification code, to the second extension.

* * * * *